United States Patent [19]
Ekman

[11] 4,140,501
[45] Feb. 20, 1979

[54] WET GAS MODULAR VENTURI SCRUBBING APPARATUS

[76] Inventor: Frank Ekman, R.R. 2 Tamarack La., Barrington, Ill. 60010

[21] Appl. No.: 640,071

[22] Filed: Dec. 12, 1975

[51] Int. Cl.² .............................................. B01D 47/00
[52] U.S. Cl. .................................. 55/242; 55/257 OV; 55/442; 261/DIG. 54; 261/111; 261/116
[58] Field of Search ...................... 55/90, 242, 93, 94, 55/233, 240, 241, 257 OV, 440, 442; 261/116, DIG. 54, 111

[56] References Cited

U.S. PATENT DOCUMENTS

| | | | |
|---|---|---|---|
| 1,521,578 | 12/1924 | Wittemeier | 55/444 |
| 2,110,203 | 3/1938 | Crawford | 55/90 |
| 2,143,979 | 1/1939 | Feinberg | 55/233 |
| 2,349,944 | 5/1944 | Dixon | 55/444 |
| 2,793,709 | 5/1957 | White | 55/241 |
| 2,890,870 | 6/1959 | Spiselman | 55/443 |
| 3,181,287 | 5/1965 | Rabson | 55/443 |
| 3,372,530 | 3/1968 | Zimmer | 261/116 |
| 3,488,039 | 1/1970 | Ekman | 55/290 |
| 3,581,474 | 6/1971 | Kent | 55/233 |
| 3,733,778 | 5/1973 | Hungate et al. | 55/90 |
| 3,738,624 | 6/1973 | McIlvaine | 55/226 |
| 3,834,129 | 9/1974 | Darlinger et al. | 55/242 |
| 3,880,624 | 4/1975 | Arnold et al. | 55/242 |

*Primary Examiner*—Bernard Nozick
*Attorney, Agent, or Firm*—Darbo & Vandenburgh

[57] ABSTRACT

The multiple-throat venturi wet gas scrubbing apparatus embodies modular venturi entry apparatus and progressively finer demister vane sections in a horizontal scrubbing unit for in-line connection in gas stream piping or ducting and mounting with its stream propulsion fan on a single platform. The modular design of the entire apparatus is calculated to maximize standardization and prefabrication which together with the in-line design results in substantial cost and space advantages as well as optimum uniform flow throughout the apparatus.

6 Claims, 12 Drawing Figures

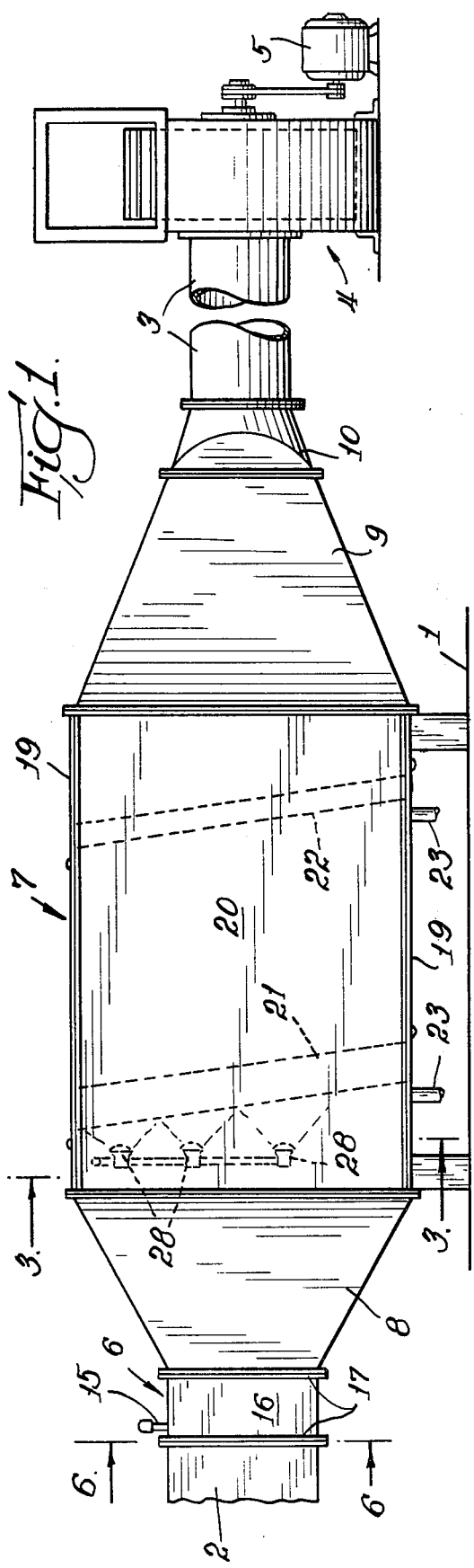
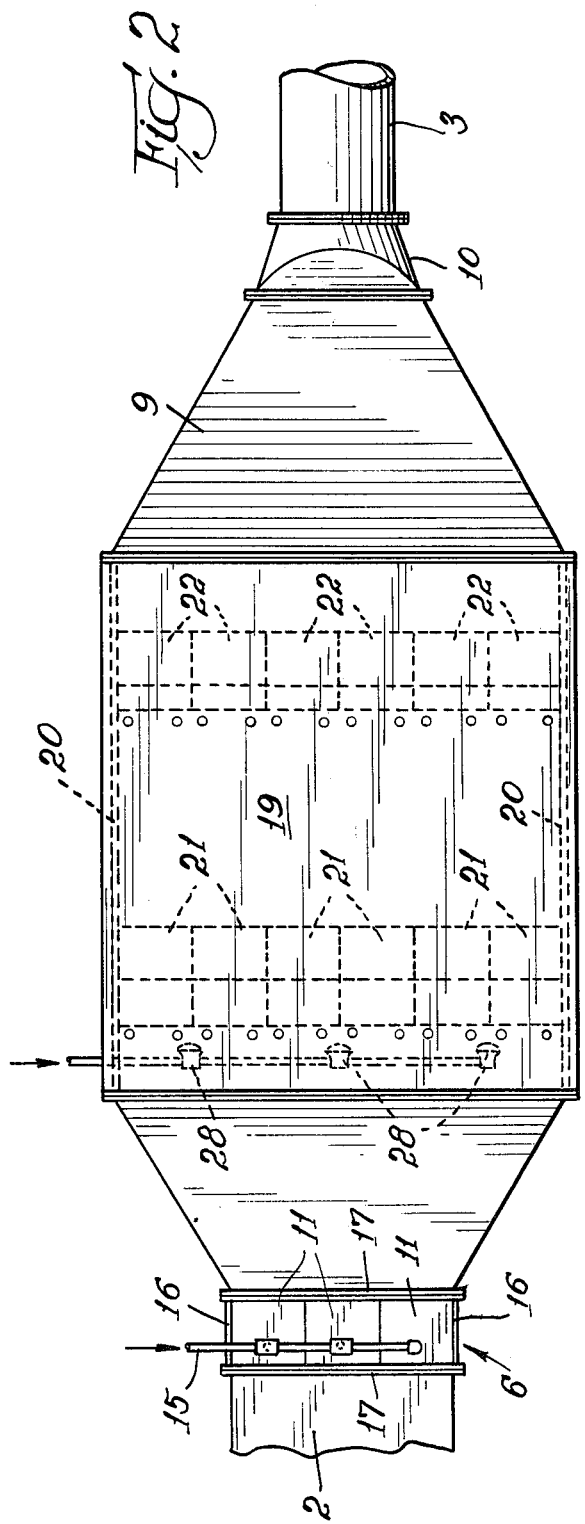

WET GAS MODULAR VENTURI SCRUBBING APPARATUS

BACKGROUND AND SUMMARY OF THE INVENTION

Gas scrubbing apparatus has long been used for the removal of particulate material entrained in gas streams or for the absorption of noxious or otherwise selected gases and vapors from air or other gas streams. In the wet gas scrubbing process, a liquid, ordinarily water, is sprayed into the gas stream to wet and pick up the particulate matter after which the droplets holding the particulate material are removed from the stream and collected. It is well known that the efficiency of particulate removal is increased by passing the gas stream through a venturi tube with the scrubbing liquid sprayed into the stream just upstream of the throat. The rapid acceleration of the gases enhances the scrubbing action. The use of multiple-throat venturis offer special advantages in scrubber applications especially with respect to the efficient use of space.

An example of a multiple-throat venturi scrubber is shown and described in Ekman U.S. Pat. No. 3,488,039.

Conventionally, separators of the cyclone type are used to remove the particulate-laden scrubbing liquid downstream of the multiple-throat venturi scrubber. The vane-type separators, such as that shown in Halter et al U.S. Pat. No. 3,405,511, are also used to remove entrained liquid particles from gaseous streams.

Conventionally, although not invariably, scrubbing apparatus has been designed for upward flow of the gas stream through the scrubber components, the inlet being horizontal for connection with a horizontal run of duct. The scrubber outlet at the top of the unit may be horizontal or vertical.

Industrial scrubbing apparatus must be designed to meet the requirements of a particular application with particular reference to the volume and flow characteristics of the gas to be treated, the nature of the particulate or gaseous matter to be removed and other physical factors. With application specifications established, the scrubbing apparatus, usually very large, is largely custom designed, fabricated and shipped to the site. This approach is time consuming, and frequently involves very expensive damage in shipment.

The object of the invention is to provide in-line wet scrubbing apparatus composed of modular component parts and having horizontal, substantially coaxial inlet and outlet for convenient and space-efficient connection in a horizontal run of the gas-flow duct in the industrial plant. A further object is to minimize both the production time and cost of such scrubbing apparatus by standardizing multiple-throat venturi and vane-type demister subassembly sections whereby standard modular components may be fabricated in the factory and shipped for on-site fabrication of the scrubbing apparatus in position for use with minimum need for special parts and shapes. A further object is to provide scrubbing apparatus with successive demister components adapted for the successive removal of coarse and fine liquid particles.

The ultimate object of the invention is to provide wet scrubbing apparatus which can be supplied without undue delay, at greatly reduced cost and requiring minimum space on location.

DESCRIPTION OF THE DRAWINGS

In the accompanying drawings,

FIG. 1 is an elevational view of the wet gas scrubbing apparatus of the invention;

FIG. 2 is a plan view thereof;

DESCRIPTION OF PREFERRED EMBODIMENT OF THE INVENTION

Figure 3:
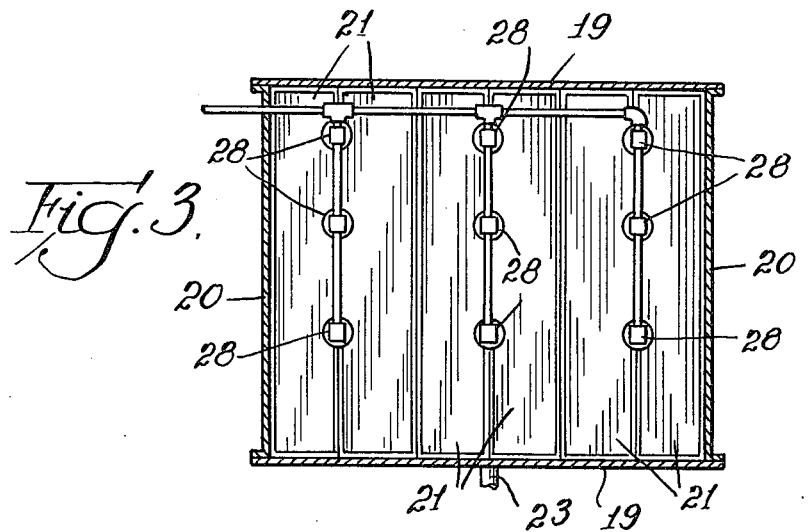
FIG. 3 is a cross-sectional view taken at the line 3—3 of FIG. 1.

For simplicity and clarity, the invention will be described as embodied in apparatus for scrubbing flowing streams of air using water as the scrubbing liquid. Since multiple-throat venturis and vane-type separators, as such, are known, structural criteria and modes of operation will not be described in detail herein. Also, since the particular means, such as welding, bolting, etc., of fastening the structural parts of the scrubbing apparatus together constitute no part of the invention, they will not be described in detail.

A typical wet gas scrubbing apparatus embodying the invention is illustrated in side elevation in FIG. 1 and in plan in FIG. 2. It is connected in a horizontal run of duct or conduit carrying the air stream with entrained particulate matter and is mounted upon a platform 1. The end 2 of the duct opens into the inlet end of the scrubbing apparatus and duct 3 receives the scrubbed air stream and connects with a suitable blower 4 which, together with its driving motor 5, may also be mounted upon platform 1 and moves the air through the duct and scrubbing apparatus.

The scrubbing apparatus comprises a multiple-throat venturi section 6, a separator or demister section 7, an inlet manifold 8 which connects the outlet of the venturi section 6 with the inlet end of demister section 7, an outlet manifold 9 and a conversion section 10 for connecting the rectangular outlet end of manifold 9 with cylindrical conduit 3. With the exception of the outlet end of the conversion section 10 (and the inner end of a conversion section, not shown, if used to connect a round duct 2 with venturi section 6), all of these parts of the scrubbing apparatus are rectangular in cross section to enhance their adaptability to modularization in accordance with an important aspect of the invention.

Figure 6:
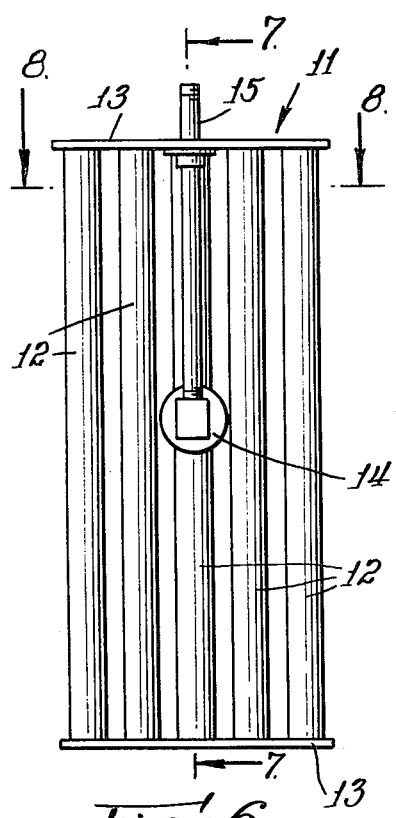
FIG. 6 is a cross-sectional view taken at the line 6—6 of FIG. 1 and showing a single multiple-throat venturi module.

As is seen in FIG. 2, the multiple-throat venturi section 6 is composed of three modular venturi units 11 arranged side-by-side for the flow of the air stream therethrough in parallel. As is shown in FIG. 6, each module 11 comprises a plurality of vertically disposed rods 12 arranged in a plane transverse to the direction of flow of the air stream in spaced-apart relationship. The rods may be, for example, one-inch pipes spaced apart to leave one inch venturi throats between adjacent pipes. The rods or pipes are mounted in top and bottom plates 13 by welding or otherwise to form a modular unit which may be, for example, one foot wide. A spray head 14 is also mounted in top plate 13 by means of water supply piping 15.

Figure 7:
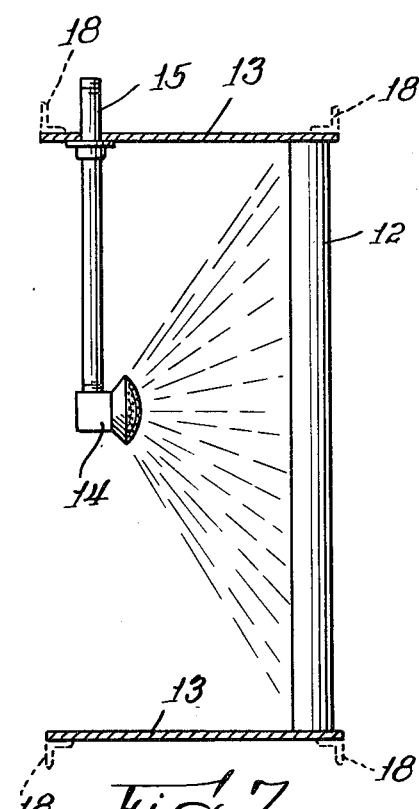
FIG. 7 is a cross-sectional view taken at the line 7—7 of FIG. 6.
Figure 8:
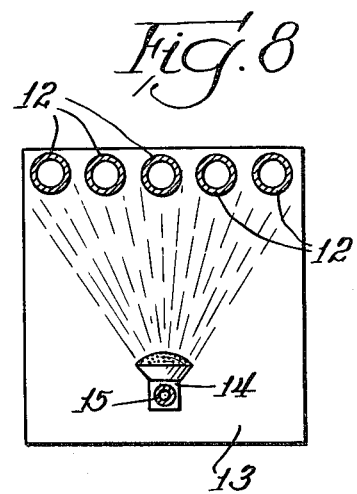
FIG. 8 is a cross-sectional view taken at the line 8—8 of FIG. 6.

To produce the multiple-throat venturi section 6 from three of the venturi modules 11, the units are placed side-by-side with abutting edges of the top and bottom plates 13 welded together. Sidewall plates 16 may be welded to the top and bottom plates to complete the rectangular duct section which encloses the venturi units. For connection of the section to duct end 2 and to the inlet end of intake manifold 8, flanges 17 may be provided by, for example, welding angle irons 18 to the top, bottom and side plates of the venturi module as indicated in dotted lines in FIG. 7.

Figure 9:
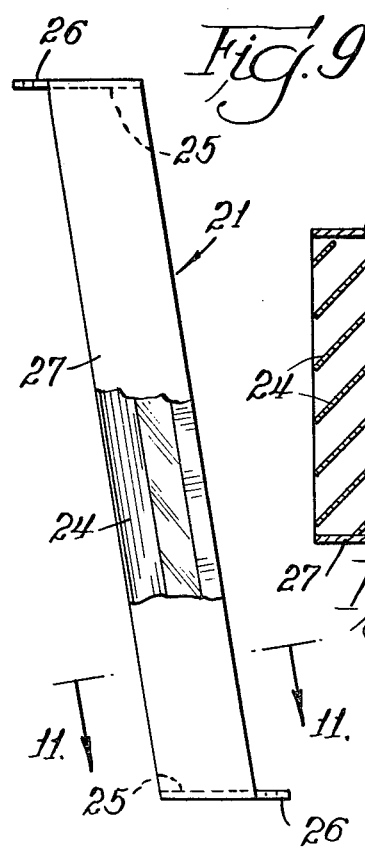
FIGS. 9 and 10 are side views, partly in section, of vane separator elements shown in dotted lines in FIG. 1, and FIGS. 11 and 12 are cross-sectional views of the vane separator assemblies taken at the lines 11—11 and 12—12, respectively.
Figure 11:
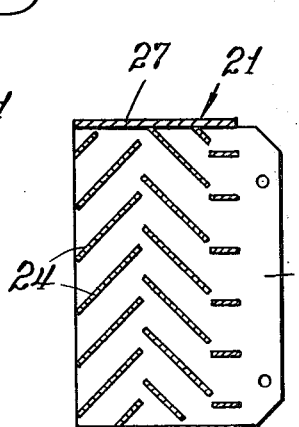
Figure 10:
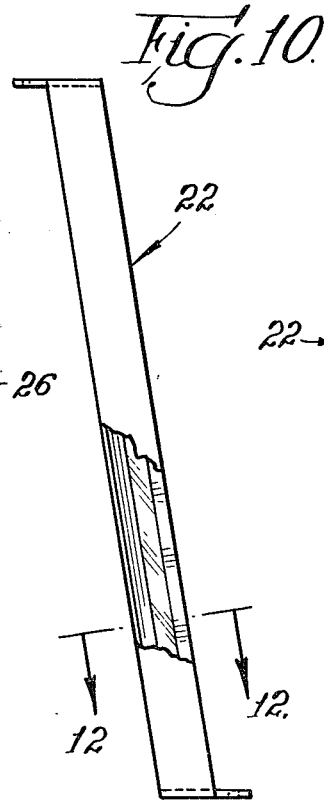
Figure 12:
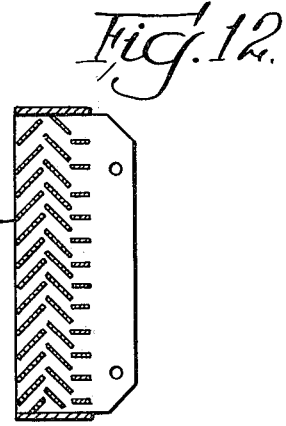

The housing of the demister section 7 is composed of top and bottom plates 19 and side plates 20. Vane-type separators or demisters 21 and 22 are mounted to the top and bottom plates of this housing. These may be bolted, welded or otherwise fastened in position. As is seen in the plan view of FIG. 2, six modular demister units 21 are arranged side-by-side to span the distance between side plates 20 of the demister unit. These are the coarse vane assemblies shown separately in FIGS. 9 and 11. Each demister 21 is a modular unit which may, for example, be one foot wide and it is designed for use either alone in scrubbing apparatus of minimum capacity or with additional modules as required to handle specification conditions. The demisters are designed to be mounted at an angle to the flow of the air stream with their bottoms being farther downstream so that the friction of the flow past the vane surfaces will serve to impel the water on these surfaces downwardly toward the drains 23. The zig-zag vanes 24 may be mounted to top and bottom plates 25 having extension flanges 26 for mounting the modular demister units in the separator section. Side plates 27 complete the demister module 21 assembly.

Demister module components 22 are similar to demisters 21 in every way except that the vanes are placed closer together and the vane assembly otherwise designed in such a way as to collect and separate a larger proportion of the finest liquid particles entrained in the air stream. Thus, the first demisters encountered by the air stream are relatively coarse units which will separate out the larger liquid droplets without danger of plugging of the assembly by solid and other particulate matter carried by the droplets. The separation process is completed by the finer demisters 22. If desired, a series of three or more demister stages may be employed.

Optionally, water-spraying equipment 28 may be provided to continuously spray demister units 21 to ensure the washing away of solid particulate matter that accumulates upon the surfaces of the vanes of the demisters. As illustrated in FIG. 3, a gang of three sprayer units, each consisting of three sprayheads, serve the six demister modules which span the space between side walls 20 of the separator section housing.

Figure 4:
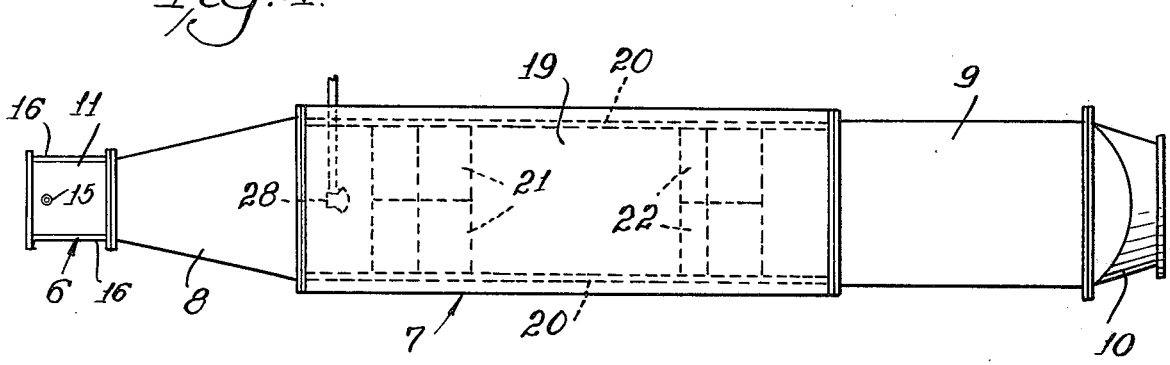
FIGS. 4 and 5 are plan views showing the modular component arrangement of different sizes of the scrubbing apparatus.
Figure 5:
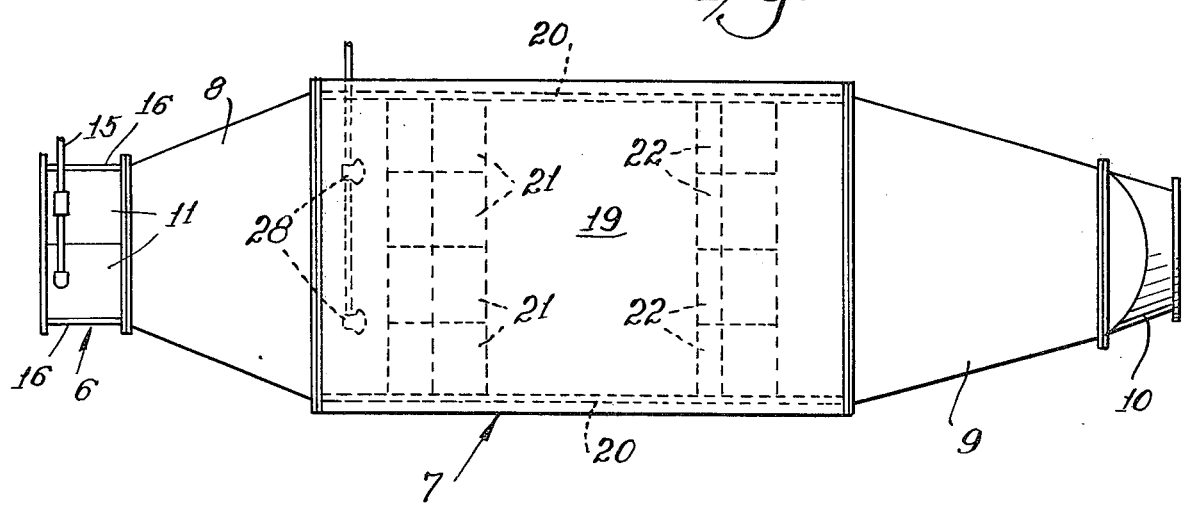

In accordance with the invention, the multiple-throat venturi modules, three of which are employed in the apparatus just described, and demister modules, six of each type of which are employed in the apparatus just described, may be used in the construction of wet gas scrubbing apparatus of greater or lesser capacity. The scrubbing apparatus shown in plan view in FIG. 4, for example, incorporates a single venturi module 11 as its multiple-throat venturi section 6 and two of each type of demister module 21, 22. The intermediate capacity scrubbing apparatus shown in FIG. 5 employs two venturi modules to form the multiple-throat venturi section 6 and four to each type of demister module 21, 22.

From the foregoing, it will be understood that the venturi modules and the demister modules for the scrubbing apparatus of various capacities are standard units that have been manufactured as stock items in the factory and shipped out in the numbers required for fabrication in the field of the scrubbing apparatus. The required number of modular units are arranged side-by-side as shown in the example already described. Side plates 16 for the venturi sections and side plates 20 of the demister sections are standard and may be shipped out with the venturi and demister modules. The conversion sections 10 are also standard units. The top and bottom plates forming the housing for the separator units may be fabricated in a reasonable number of standard sizes and are selected and shipped to meet requirements of a particular scrubbing apparatus. Similarly, inlet and outlet manifolds may be fabricated in a reasonable series of standard sizes for selection and shipment to meet particular unit requirements.

ACHIEVEMENT

This invention meets the heretofore unresolved problems involved in the procurement, installation and use of wet scrubbing apparatus. Bulky scrubbers designed to meet performance specifications, were manufactured, complete, in the factory and then shipped to the use sites. The custom procedure is expensive as is transportation of the finished equipment. Installation is also costly and usually involves space problems and special ducting arrangements for inlet and outlet connections.

The scrubbing apparatus of the invention as herein described is fabricated to meet performance specifications by selecting the necessary number of standard modular components and appropriate standard parts, shipping these "knocked down" to the site and there fabricated on a supporting platform with in-line connections, all at minimum cost and with minimum space requirements. Continuous horizontal flow through the apparatus and connecting ducts contributes to efficient operation. Scrubbing apparatus for a particular job may be specified, shipped, fabricated and installed, and put in service in a relatively short period of time and at relatively low cost.

As is well known, certain flow conditions, such as velocity and distance of flow through the scrubbing apparatus are optimum for efficient results. Because the stream being treated flows straight through the apparatus from inlet to the venturi section to outlet from the demister section, all elements of the stream are subjected to the same — optimum — conditions of flow with resulting optimum results.

I claim:

1. Multiple-throat venturi wet gas scrubbing apparatus adapted for in-line connection in a horizontal run of gas flow ducting comprising a venturi section rectangular in cross section and containing a plurality of modular multiple-throat standard venturi units arranged side-by-side and each having an inlet adapted to be connected to upstream ducting and a rectangular outlet; each said standard venturi unit comprising a plurality of generally vertical coplanar round rods of equal length and spaced apart in parallel relationship to define a plurality of parallel coplanar venturi throats, substantially identical horizontal rectangular top and bottom plates to which the respective ends of said rods are respectively permanently and rigidly secured, the plane defined by said rods being normal to the side edges of said rectangular plates, and spraying apparatus mounted in one of said plates; a demister section arranged downstream from said venturi section and containing at least one modular demister unit therein, said demister section being rectangular in cross section and having a rectangular inlet and a rectangular outlet; an inlet manifold unit initially separate from but in the assembled apparatus connecting said outlet of said venturi section with said inlet of said demister section; and means for connecting said outlet of said demister section with downstream ducting, said venturi section and said demister section being substantially coaxial and said apparatus being substantially coaxial with said ducting whereby a stream of gases flowing through said ducting flows horizontally substantially straight through said apparatus.

2. Apparatus in accordance with claim 1 and including spraying apparatus mounted within the demister section for spraying the upstream side of the demister unit with washing liquid.

3. Apparatus in accordance with claim 1 wherein the demister unit comprises a panel of staggered vanes defining tortuous passageways therethrough from the upstream face of said panel to the downstream face thereof, said panel being arranged at an angle to vertical with its bottom farther downstream than its top.

4. Apparatus in accordance with claim 1 wherein the demister section contains a plurality of modular demister units arranged side-by-side therein for flow of a gas stream therethrough in parallel.

5. Apparatus in accordance with claim 1 wherein the demister section contains a plurality of demister units arranged in succession therein for flow of a gas stream through said demister units in series.

6. Apparatus in accordance with claim 5 wherein the demister section contains demister units arranged side-by-side for parallel flow therethrough and an equal number of demister units arranged downstream side-by-side for parallel flow therethrough following flow through said first-mentioned side-by-side units.

* * * * *